United States Patent Office 3,188,222
Patented June 8, 1965

3,188,222
CEMENT COMPOSITION
Philip H. Harris, Upland, Calif., assignor to American Cement Corporation, Los Angeles, Calif., a corporation of Delaware
No Drawing. Filed Sept. 28, 1962, Ser. No. 227,040
4 Claims. (Cl. 106—89)

This invention relates to cement products and particularly to cement mortars used with bricks.

The surfaces of bricks made fast with cement mortar in the construction of buildings, dwellings, or walls frequently acquire a whitish appearance as setting of the mortar occurs. This unsightly effect is the result of efflorescence whereby a surface crust is deposited by sodium and/or potassium salts leached from the mortar and/or atmospheric carbonation of calcium hydroxide present in the mortar. The degree of efflorescence can be affected by factors such as the source of the brick clay, exposure conditions, poor aggregate, high water-cement ratios, and poor placing techniques. Furthermore, the sodium and/or potassium salt content of the cement constituent of the mortar affects efflorescence. A low content of these alkali metal salts in the cement, such as contents below 0.2%, is generally found to produce very slight efflorescence or none at all. However, in combination with the other factors enumerated above, sodium and/or potassium salt contents of above 0.2% can produce significant to severe efflorescence.

The present invention is a cement product that eliminates or markedly inhibits efflorescence and is particularly useful in mortars made from cements having sodium and/or potassium salt contents in the range from 0.3% to 0.6%. The cement product according to the present invention enables utilization of relatively high sodium and/or potassium salt content cements in mortars without significant problems of efflorescence. In accordance with the present invention, it has been found that a cement product comprising hydraulic cement and from 0.1% to 0.5% lithium carbonate by weight of the cement eliminates or substantially reduces efflorescence. In a presently preferred form, the amount of lithium carbonate in the cement product is about 0.3% by weight of the cement.

It has also been found in accordance with the present invention that lithium carbonate in amounts from 0.1% to 0.5% by weight of the cement can be combined with up to 1% barium carbonate by weight of cement to eliminate or substantially reduce efflorescence. The use of barium carbonate in conjunction with lithium carbonate is particularly preferred where the cement itself has a high sulfate content. When used in conjunction with barium carbonate, lithium carbonate in the amount of about 0.1% by weight of the cement is presently preferred.

While the mechanism by which lithium carbonate eliminates efflorescence is not fully understood, it is believed that in part the lithium ions act to reduce substantially the mobility of the sodium and potassium ions present in the cement. However, the addition of lithium in the form of the carbonate has been found to be particularly advantageous in overcoming problems of efflorescence.

The advantages of the cement product according to the present invention will be better understood from the following description of examples in which cement products according to the invention have been utilized as mortars in construction of brick walls.

A series of wall sections were constructed of Valley brick in a location having full exposure to the weather and oriented so that one lateral face of the wall was exposed to the east sun and the other lateral face of the wall was exposed to the west sun. Each section was about three bricks in length, about ten bricks in height, and was of a double construction with mortar between the two faces. The wall sections were sealed from the bottom slab.

The nature of the mortar used in the various sections to make fast the bricks in a conventional manner is set forth in the table below:

Wall identification: Mortar
Section 1 ____ Portland cement without additive.
Section 2 ____ Portland cement with 0.3% $LiCO_3$.
Section 3 ____ Portland cement with 0.5% $BaCO_3$.
Section 4 ____ Portland cement with 0.5% $BaCO_3$ and 0.1% $LiCO_3$.

(Note: All percentages given are by weight of cement.)

The wall sections were periodically examined and photographed to determine the extent, if any, to which efflorescence had occurred.

After two weeks, Section 1, which constituted the control wall section, exhibited efflorescence over a considerable portion of the bricks constituting both the west and east faces, the degree of efflorescence being greater on the east face. After the same period of time, Section 2, in which the mortar was made with a cement product according to the present invention, had no detectable efflorescence on either face.

In Section 3 of the wall, the mortar was made from a cement which contained 0.5% barium carbonate. After two weeks, significant efflorescence appeared on the bricks constituting the east face and scattered efflorescence appeared over many bricks constituting the west face. However in Section 4 of the wall, where the mortar was made from a cement containing 0.1% lithium carbonate as well as 0.5% barium carbonate, no efflorescence appeared on the east face bricks and only slight efflorescence appeared on a few bricks at the edges of these bricks immediately adjacent the mortar.

Later observations showed no change in the appearance of the wall section made with mortar formed from the cement product according to this invention.

I claim:
1. A dry cement composition for use as a mortar for bricks consisting essentially of Portland cement and from 0.1% to 0.5% lithium carbonate by weight of the cement.
2. A dry cement composition for use as a mortar for bricks consisting essentially of Portland cement and about 0.3% lithium carbonate by weight of the cement.
3. A dry cement composition for use as a mortar for bricks consisting essentially of Portland cement, from 0.1% to 0.5% lithium carbonate by weight of the cement, and up to 1% barium carbonate by weight of the cement.
4. A dry cement composition for use as a mortar for bricks consisting essentially of Portland cement, about 0.3% lithium carbonate by weight of the cement, and about 0.5% barium carbonate by weight of the cement.

References Cited by the Examiner
UNITED STATES PATENTS

| | | | |
|---|---|---|---|
| 1,296,468 | 3/19 | Blumenberg | 106—89 |
| 2,806,530 | 9/57 | Finkley | 106—89 |
| 2,868,295 | 1/59 | Brooks et al. | 106—89 |

OTHER REFERENCES

"The Manufacture of Hydraulic Cements," Bleininger, 1904, page 366.

TOBIAS E. LEVOW, Primary Examiner.